Figure 1:
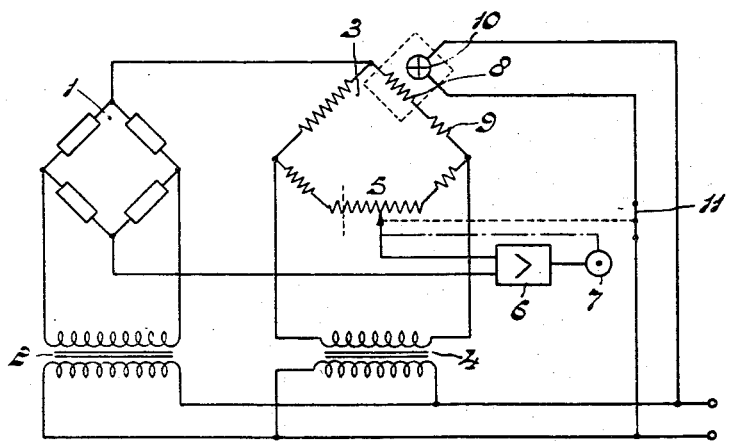

Aug. 5, 1958    G. W. VAN SANTEN    2,846,646
MEASURING OR RECORDING DEVICE
Filed June 7, 1954

INVENTOR
GERARD WILLEM VAN SANTEN

BY Fred M Vogel
AGENT

United States Patent Office 2,846,646
Patented Aug. 5, 1958

2,846,646
MEASURING OR RECORDING DEVICE

Gerard Willem Van Santen, Eindhoven, Netherlands, assignor, by mesne assignments, to North American Philips Company, Inc., New York, N. Y., a corporation of Delaware Application June 7, 1954, Serial No. 434,911

Claims priority, application Netherlands June 17, 1953

8 Claims. (Cl. 324—62)

The present invention relates to electrical measuring apparatus. More particularly, the invention relates to a measuring or recording device for physical values such as electrical voltages, pressures, mechanical tensions, temperatures, etc. which vary comparatively rapidly, and in which an electrical voltage is derived from the value to be measured or recorded. More particularly, in recording devices the electrical voltage is not used directly for adjusting the position of the recording member, but it is combined with a second electrical voltage determined by the position of the recording member and occurring across a circuit which is connected, if desired, with the interposition of an amplifier to the circuit of an electric motor. The motor serves to drive the recording member and comes to a standstill as soon as the difference between the two voltages has become zero.

The voltages may be derived in different ways. The first voltage may be derived from a bridge connection which is fed from an alternating-current supply. The second voltage may then be derived from a second bridge which is supplied by the same supply and of which two branches are constituted by a potentiometer of which the slidable contact driven by the motor is coupled directly to a recording member. If the value to be measured is zero, the slidable contact is at a point on the potentiometer such that the total voltage which is active in the circuit for driving the motor is zero. This is the zero point of the scale for the value to be measured or recorded.

In certain cases the voltage derived from the value to be measured or recorded may be subject to certain slow variations which have no relationship with the said value. If, for example, mechanical tensions are measured by means of strain gauges, the gauges are frequently exposed to such atmospheric influences, more particularly thermal influences, that undesired variations in the resistances of the gauges occur. This involves a deviation from the zero position of the measuring or recording member, even if the gauges are not subject to strain. The object of the invention is to obviate such a disadvantage.

The present invention comprises a measuring or recording device for values varying comparatively quickly, in which an electrical voltage derived from the value to be measured or recorded, together with a second electrical voltage determined by the position of an indicating member for this value, is active in a circuit and the difference voltage, if desired after being amplified, acts upon a motor displacing the indicating member, and comprises means for controlling the second voltage in such manner that slow variations in the first voltage which have no relationship with the value to be measured or recorded are compensated in the circuit.

As a rule, it is required that, during a determined period, the sum of all periods during which the value to be measured be zero, is larger than the sum of the periods in which it has a determined value.

If the second voltage is derived from a bridge connection comprising a potentiometer of which the sliding contact, which constitutes a diagonal point of the bridge, is coupled to the indicating member and driven by the motor, the compensation may be insured by providing that one of the other resistors of the bridge or part thereof is constituted by a resistor element having a high temperature coefficient and by arranging in the vicinity of the resistor element a heating element which is controlled by the sliding contact of the potentiometer. This may be effected in such manner that, when the sliding contact is remote from the zero position, the resistor element having a high temperature coefficient is slowly heated to the sense that the equilibrium of the bridge is interrupted so that the motor is started and the sliding contact is moved back to the zero position. As a rule, use is preferably made of a resistor element having a negative temperature coefficient, since the variation in resistance per degree of such an element is in most cases greater than that of resistor elements having a positive temperature coefficient.

Figure 2:
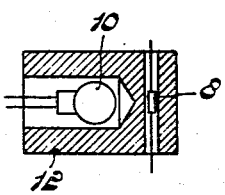

In order that the invention may be readily carried into effect, it will now be described with reference to the accompanying drawing, given by way of example, in which:

Fig. 1 is a schematic diagram of a measuring or recording device of the present invention; and Fig. 2 is a schematic diagram of a housing for two components of Fig. 1.

In Fig. 1, reference numeral 1 indicates a device for deriving an electrical voltage from the value to be measured or recorded. The latter may be, for example, a mechanical tension in a part of an engine, more particularly a part of a roller. It is assumed that the mechanical stress varies comparatively rapidly with time; it may consist of, for example a regular or irregular sequence of peaks.

The device 1 is shown as an element bridge which is fed by way of a transformer 2 from the alternating current supply. In the measurement of mechanical tensions the branches of the bridge are constituted by impedances, the values of which are dependent upon the mechanical tension to be measured. It is known to utilize for this purpose so-called strain gauges which are secured in a predetermined manner to the part of an engine in which the tension as a function of time is to be measured. It is fundamentally possible that one of the four impedances of the bridge is in the form of a strain gauge, but preferably such gauges are used for all four impedances and secured to a part of an engine in such a manner that two gauges opposing one another in the bridge are subject to strain and the other two are either not loaded or subject to a pressure load. It is thus possible to compensate to a certain extent for the influence of the ambient temperature.

However, as a result of the irregular heating of the strain gauges, undesired variations in the resistance values thereof are also effective. These variations become manifest in a displacement of the zero point of the indicating instrument.

In the case under consideration, the indication instrument is constituted by the arm of a potentiometer 5 which constitutes one side of a balancing bridge 3 which is fed by way of a transformer 4 from the same alternating current supply as the first bridge, thus suppressing the influence of variations in the supply voltage upon the indication. The two upper diagonal points of the two bridges are interconnected directly. The lower diagonal point of the bridge 1 and the sliding contact of the potentiometer 5 are connected to an amplifier 6, of which the output circuit supplies an electric motor 7 which drives the sliding contact of the potentiometer, either directly or by way of a relay comprising switches.

It is assumed that the bridge 1 is in equilibrium when the value to be measured is nil. The sliding contact then occupies, for example, the position indicated by the vertical dotted line through resistor 5 and the voltage set up at the amplifier 6 is zero. In this case the electric motor 7 is at rest. When the equilibrium of the bridge 1 is interrupted due to loading of the part of the engine having the strain gauges secured to it, an alternating voltage is produced across the input circuit of the amplifier 6, so that the motor 7 is started, displacing the sliding contact to the right so that the voltage across the input circuit of the amplifier again becomes zero. The degree of displacement of the sliding contact is a measure of the value to be measured. The sliding contact is connected either to an indicating member or a recording member.

Variations in the zero point of the scale along the resistor 5 occur as a result of irregular heating of the impedance elements of the bridge 1. In order to avoid this, the resistance of one of the branches of the bridge 3 is constituted in part by a resistor having a high negative temperature coefficient, which may be connected in series with a fixed resistor 9. The resistor 8 having a negative temperature coefficient is combined with a heating element 10, preferably in the form of a small incandescent lamp, which is connected by way of a switch 11 to the alternating current supply. The switch 11 is coupled to the sliding contact of the resistor 5 in such a manner that, when said contact is at the right-hand side of the zero position indicated by the vertical dotted line through said resistor, said switch is closed. The switch is preferably coupled to the sliding contact with the interposition of one or more relays or an amplifier.

When the impedances of the bridge 1 are not mechanically stressed, but the equilibrium of the bridge is interrupted, for example as a result of irregular heating of said impedances, the sliding contact will be, for example, at the right-hand side of the zero point. The resistor 8 is thus slowly heated, as a result of which the electric motor 7, which is phase-sensitive, starts to rotate in a sense such that the sliding contact is moved to the left. The switch is open when the sliding contact is at the left-hand side of the zero position. The heating of the resistor 8 then ceases, so that the motor moves the sliding contact to the right. The arrangement may be such that the deviation from the zero position resulting from this control on and off remains very small.

In order to prevent this control from reacting also upon the comparatively rapid variations of the value to be measured or controlled which interrupts the equilibrium of the bridge 1, the resistor 8 is given a comparatively great thermal inertia. It is commonly necessary to utilize particular means for increasing the thermal inertia of the resistor element.

Fig. 2 shows an embodiment of the combination of the resistor element 8 with the heating element 10. The heating element, which may be for example, a small incandescent lamp 10, is provided in a cavity of a block 12 consisting of, for example, aluminum. In the vicinity of the cavity there is provided in the block a channel-like aperture containing the resistor element 8. The latter is insulated with respect to the block. It has been found that a sufficient thermal inertia, together with an advantageous heating and cooling characteristic is thus obtained.

The invention is not limited to measuring devices comprising strain gauges. In measuring and recording electrical voltages and other values it may be that rapid variations in a value are to be recorded and slower variations resulting from certain effects are not to be recorded. In all these cases use may be made of the device according to the invention.

While the invention has been described by means of a specific example and in a specific embodiment, I do not wish to be limited thereto for obvious modifications will occur to those skilled in the art without departing from the spirit and scope of the invention.

What is claimed is:

1. Electrical measuring apparatus comprising means for producing a first voltage having relatively rapid variations as determined by variations of a condition to be measured and having relatively slow variations as determined by variations of the equilibrium condition of said first voltage producing means, means for producing a second voltage, means for interconnecting said voltage producing means and for deriving the difference voltage of said first voltage and said second voltage, means responsive to said difference voltage for producing relatively rapid variations of said second voltage as determined by the said rapid variations of said first voltage, and means coupled to said last-mentioned means for further varying said second voltage as determined by the said relatively slow variations of said first voltage whereby said difference voltage is unaffected by slow variations in said first voltage.

2. Electrical measuring apparatus comprising means for producing a first voltage having relatively rapid variations as determined by variations of a condition to be measured and having relatively slow variations as determined by variations of the equilibrium condition of said first voltage producing means, means for producing a second voltage, means for interconnecting said voltage producing means and for deriving the difference voltage of said first voltage and said second voltage, means responsive to said difference voltage for producing relatively rapid variations of said second voltage as determined by the said rapid variations of said first voltage comprising indicating means forming a part of said second voltage producing means having a movable indicator, an electric motor, means for positioning said indicator in accordance with the direction of rotation of said motor and means for applying said difference voltage to said motor thereby to drive same, and means coupled to said indicator for further varying said second voltage as determined by the said relatively slow variations of said first voltage whereby said difference voltage is unaffected by slow variations in said first voltage.

3. Electrical measuring apparatus comprising means for producing a first voltage having relatively rapid variations as determined by variations of a condition to be measured and having relatively slow variations as determined by variations of the equilibrium condition of said first voltage producing means, means for producing a second voltage comprising a balancing bridge having input and output terminals, means for supplying electrical power to said input terminals to energize said bridge, means for interconnecting said voltage producing means and for deriving the difference voltage of said first voltage and said second voltage, means responsive to said difference voltage for producing relatively rapid variations of said second voltage as determined by the said rapid variations of said first voltage comprising indicating means forming a part of said balancing bridge having a movable indicator, an electric motor, means for positioning said indicator in accordance with the direction of rotation of said motor and means for applying said difference voltage to said motor thereby to drive same, and means coupled to said indicator for further varying said second voltage as determined by said relatively slow variations of said first voltage comprising a variable impedance forming a part of said balancing bridge comprising a thermal-responsive resistor having a high temperature coefficient and a relatively high thermal inertia, a heating element in operative proximity to said resistor and means for energizing said heating element in accordance with the position of said indicator thereby to vary the resistance of said resistor whereby said difference voltage is unaffected by slow variations in said first voltage.

4. Electrical measuring apparatus comprising means for producing a first voltage having relatively rapid variations as determined by variations of a condition to be measured and having relatively slow variations as determined by variations of the equilibrium condition of said first voltage producing means, means for producing a second voltage comprising a balancing bridge having input and output terminals, means for supplying electrical power to said input terminals to energize said bridge, means for interconnecting said voltage producing means and for deriving the difference voltage of said first voltage and said second voltage, means responsive to said difference voltage for producing relatively rapid variations of said second voltage as determined by the said rapid variations of said first voltage comprising indicating means having a variable impedance forming a part of said balancing bridge and a slidable contact indicator for varying the impedance thereof, an electric motor, means for positioning said indicator in accordance with the direction of rotation of said motor and means for applying said difference voltage to said motor thereby to drive same, and means coupled to said indicator for further varying said second voltage as determined by said relatively slow variations of said first voltage comprising a variable impedance forming a part of said balancing bridge comprising a thermal-responsive resistor having a high negative temperature coefficient and a relatively high thermal inertia, a heating element in operative proximity to said resistor and means for energizing said heating element in accordance with the position of said indicator thereby to vary the resistance of said resistor whereby said difference voltage is unaffected by slow variations in said first voltage.

5. Electrical measuring apparatus comprising two transformers each having a primary winding and a secondary winding, said primary windings being connected to a source of A. C. power, means for producing a first voltage having relatively rapid variations as determined by variations of a condition to be measured and having relatively slow variations as determined by variations of the equilibrium condition of said first voltage producing means comprising a balanceable element bridge circuit having input and output terminals, one of said secondary windings being connected to the input terminals of said element bridge to energize said bridge, an impedance element forming part of said element bridge and variable in response to variations in said condition to be measured, means for producing a second voltage comprising a balancing bridge circuit having input and output terminals, the other of said secondary windings being connected to the input terminals of said balancing bridge to energize said balancing bridge, means for interconnecting the output terminals of said element bridge and said balancing bridge and for deriving the difference voltage of said first voltage and said second voltage comprising a direct connection between a corresponding output terminal of each said bridge and an amplifier connected between the other corresponding output terminal of each said bridge, means responsive to said difference voltage for producing relatively rapid variations of said second voltage as determined by said rapid variations of said first voltage comprising indicating means having a variable impedance forming part of said balancing bridge and a slidable contact indicator for varying the impedance thereof, a phase-sensitive electric motor coupled to the output of said amplifier thereby to drive said motor by said difference voltage, means for positioning said indicator in accordance with the direction of rotation of said motor, and means coupled to said indicator for further varying said second voltage as determined by said relatively slow variations of said first voltage comprising a variable impedance forming a part of said balancing bridge comprising a thermal-responsive resistor having a high negative temperature coefficient and a relatively high thermal inertia, a heating element in operative proximity to said resistor and means for energizing said heating element in accordance with the position of said indicator thereby to vary the resistance of said resistor whereby said difference voltage is unaffected by slow variations in said first voltage.

6. Electrical measuring apparatus as claimed in claim 5, further comprising a heat-conductive housing for said resistor and means for positioning said resistor in said housing thereby to increase the thermal inertia of said resistor.

7. Electrical measuring apparatus comprising means for producing a first voltage having relatively rapid variations as determined by variations of a condition to be measured and having relatively slow variations as determined by variations of the equilibrium condition of said first voltage producing means, means for producing a second voltage, means for interconnecting said voltage producing means and for deriving the difference voltage of said first voltage and said second voltage, means responsive to said difference voltage for producing relatively rapid variations of said second voltage as determined by the said rapid variations of said first voltage, and means coupled to said last-mentioned means for further varying said second voltage as determined by the said relatively slow variations of said first voltage including a thermal-responsive element having a high temperature coefficient and a relatively high thermal inertia whereby said difference voltage is unaffected by slow variations in said first voltage.

8. Electrical measuring apparatus comprising means for producing a first voltage having relatively rapid variations as determined by variations of a condition to be measured and having relatively slow variations as determined by variations of the equilibrium condition of said first voltage producing means, means for producing a second voltage, means for interconnecting said voltage producing means and for deriving the difference voltage of said first voltage and said second voltage, means responsive to said difference voltage for producing relatively rapid variations of said second voltage as determined by the said rapid variations of said first voltage comprising indicating means forming a part of said second voltage producing means having a movable indicator, an electric motor, means for positioning said indicator in accordance with the direction of rotation of said motor and means for applying said difference voltage to said motor thereby to drive same, and means coupled to said indicator for further varying said second voltage as determined by the said relatively slow variations of said first voltage including a thermal-responsive element having a high temperature coefficient and a relatively high thermal inertia whereby said difference voltage is unaffected by slow variations in said first voltage.

References Cited in the file of this patent

UNITED STATES PATENTS

| | | |
|---|---|---|
| 2,567,756 | Amsler | Sept. 11, 1951 |
| 2,630,007 | Howe et al. | Mar. 3, 1953 |